United States Patent
Kurosawa

(10) Patent No.: US 9,743,503 B2
(45) Date of Patent: Aug. 22, 2017

(54) LASER DEVICE AND EXTREME ULTRAVIOLET LIGHT GENERATION SYSTEM

(71) Applicant: GIGAPHOTON INC., Tochigi (JP)

(72) Inventor: Yoshiaki Kurosawa, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/202,781

(22) Filed: Jul. 6, 2016

(65) Prior Publication Data

US 2016/0316551 A1    Oct. 27, 2016

Related U.S. Application Data

(63) Continuation of application No. PCT/JP2014/053059, filed on Feb. 10, 2014.

(51) Int. Cl.
| | |
|---|---|
| *H05G 2/00* | (2006.01) |
| *H01S 3/223* | (2006.01) |
| *H01S 3/23* | (2006.01) |
| *H01S 3/034* | (2006.01) |
| *H01S 3/10* | (2006.01) |
| *H01S 3/115* | (2006.01) |
| *H01S 3/00* | (2006.01) |

(52) U.S. Cl.
CPC ............. *H05G 2/008* (2013.01); *H01S 3/034* (2013.01); *H01S 3/1003* (2013.01); *H01S 3/2232* (2013.01); *H01S 3/2316* (2013.01); *H01S 3/2325* (2013.01); *H05G 2/003* (2013.01); *H01S 3/0071* (2013.01); *H01S 3/115* (2013.01)

(58) Field of Classification Search
USPC ........... 250/504 R; 372/18, 95; 359/346, 347
See application file for complete search history.

(56) References Cited

U.S. PATENT DOCUMENTS

| | | | | |
|---|---|---|---|---|
| 5,615,043 A | * | 3/1997 | Plaessmann | .......... H01S 3/2325 359/346 |
| 2005/0161445 A1 | | 7/2005 | Ishii et al. | |
| 2010/0078577 A1 | | 4/2010 | Moriya et al. | |

(Continued)

FOREIGN PATENT DOCUMENTS

| | | |
|---|---|---|
| JP | S55-142307 A | 11/1980 |
| JP | S57-004393 A | 1/1982 |

(Continued)

OTHER PUBLICATIONS

International Search Report from corresponding PCT/JP2014/053059 dated May 13, 2014, 2 pp.

(Continued)

*Primary Examiner* — Kiet T Nguyen
(74) *Attorney, Agent, or Firm* — Studebaker & Brackett PC

(57) ABSTRACT

An example laser apparatus of the disclosure may include an oscillator capable of outputting a laser beam, a slab optical amplifier capable of amplifying the laser beam outputted by the oscillator by passing the laser beam through an optical amplification region shaped like a slab and outputting the amplified laser beam, and a mirror disposed on an optical path of the laser beam to enter the slab optical amplifier or the amplified laser beam outputted from the slab optical amplifier, the mirror being movable in a direction parallel to a plane where the laser beam travels in the slab optical amplifier.

9 Claims, 13 Drawing Sheets

(56) References Cited

U.S. PATENT DOCUMENTS

| | | |
|---|---|---|
| 2010/0117009 A1 | 5/2010 | Moriya et al. |
| 2010/0127191 A1 | 5/2010 | Partlo et al. |
| 2010/0195196 A1 | 8/2010 | Nowak et al. |
| 2012/0019826 A1 | 1/2012 | Graham et al. |
| 2012/0319014 A1 | 12/2012 | Moriya et al. |
| 2013/0148677 A1 | 6/2013 | Moriya et al. |
| 2013/0187065 A1 | 7/2013 | Moriya et al. |
| 2013/0208742 A1 | 8/2013 | Mizoguchi et al. |
| 2013/0250402 A1 | 9/2013 | Nowak et al. |
| 2014/0191108 A1 | 7/2014 | Moriya et al. |
| 2014/0348188 A1 | 11/2014 | Suganuma et al. |
| 2014/0374605 A1 | 12/2014 | Mizoguchi et al. |
| 2014/0376575 A1* | 12/2014 | Kono .................. H01S 3/2308 372/18 |

FOREIGN PATENT DOCUMENTS

| | | |
|---|---|---|
| JP | H11-179579 A | 7/1999 |
| JP | 2005-205429 A | 8/2005 |
| JP | 2010-135769 A | 6/2010 |
| JP | 2010-186735 A | 8/2010 |
| JP | 2010-186990 A | 8/2010 |
| JP | 2012-175006 A | 9/2012 |
| JP | 2013-084807 A | 5/2013 |
| JP | 2013-201388 A | 10/2013 |

OTHER PUBLICATIONS

Written Opinion from corresponding PCT/JP2014/053059 dated May 13, 2014, 4 pp.

* cited by examiner

COMPARATIVE EXAMPLE

COMPARATIVE EXAMPLE

US 9,743,503 B2

LASER DEVICE AND EXTREME ULTRAVIOLET LIGHT GENERATION SYSTEM

CROSS-REFERENCE TO RELATED APPLICATIONS

The present application is a continuation application of International Application No. PCT/JP2014/053059 filed on Feb. 10, 2014, the content of which is hereby incorporated by reference into this application.

BACKGROUND

1. Technical Field

The present disclosure relates to a laser apparatus and an extreme ultraviolet light generation system including the laser apparatus.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 70 nm to 45 nm, and further, microfabrication with feature sizes of 32 nm or less will be required. In order to meet the demand for microfabrication with feature sizes of 32 nm or less, for example, an exposure apparatus is needed in which a system for generating extreme ultraviolet (EUV) light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An example laser apparatus of the disclosure may include an oscillator capable of outputting a laser beam, a slab optical amplifier capable of amplifying the laser beam outputted by the oscillator by passing the laser beam through an optical amplification region shaped like a slab and outputting the amplified laser beam, and a mirror disposed on an optical path of the laser beam to enter the slab optical amplifier or the amplified laser beam outputted from the slab optical amplifier, the mirror being movable in a direction parallel to a plane where the laser beam travels in the slab optical amplifier.

BRIEF DESCRIPTION OF THE DRAWINGS

Hereinafter, selected embodiments of the present disclosure will be described with reference to the accompanying drawings.

DETAILED DESCRIPTION

Figure 1:
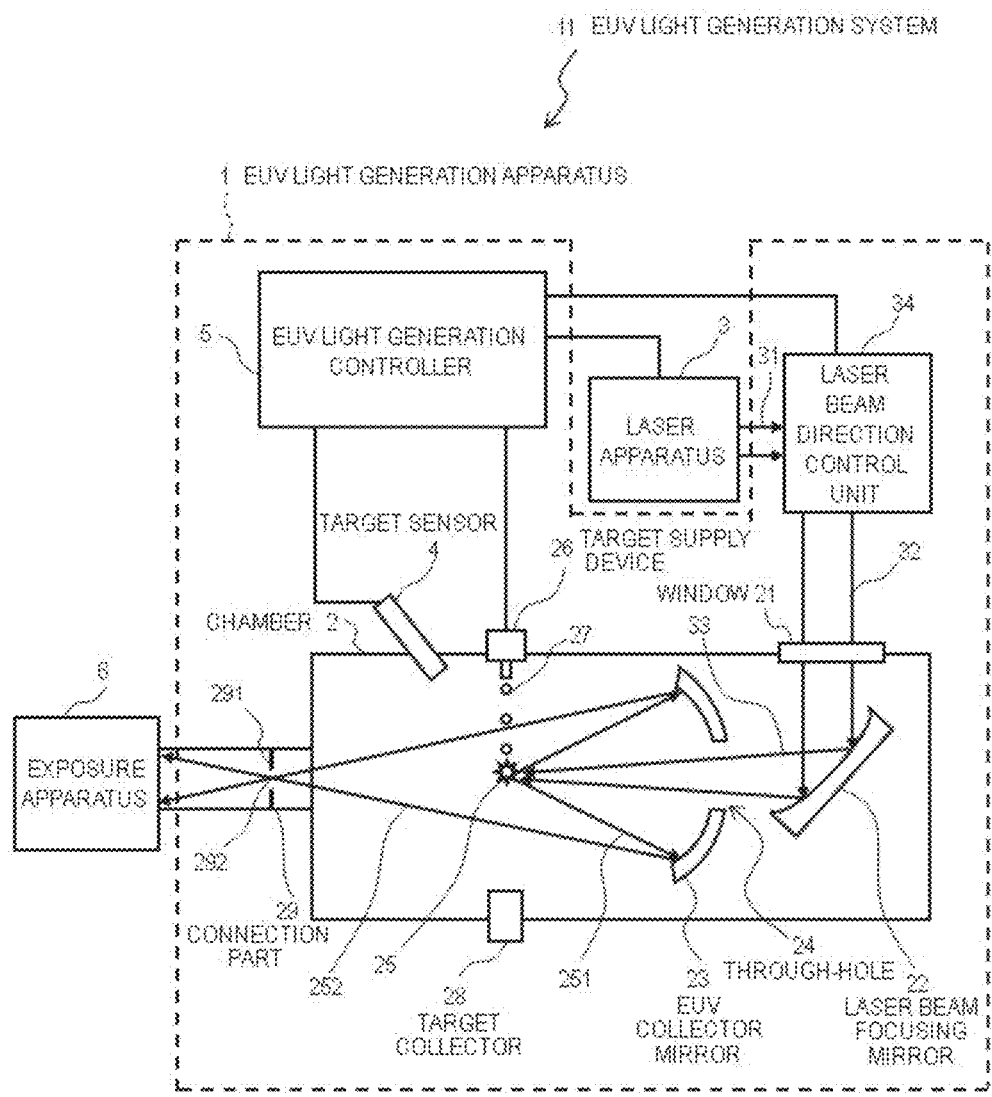
FIG. 1 schematically illustrates a configuration example of an exemplary LPP type EUV light generation system.

<Contents>
1. Overview
2. Terms
3. Overview of EUV Light Generation System
4. Comparative Example of Laser Apparatus Including Master Oscillator and Optical Amplifiers
5. Issues of Laser Apparatus of Comparative Example
6. Embodiment 1: Laser Apparatus Including Optical Path Correction Mechanism (Controlling Mirror by Optical Path Correction Mechanism)
7. Embodiment 2: Laser Apparatus Including Optical Path Correction Mechanism (Temperature Detection)
8. Embodiment 3: Laser Apparatus Including Optical Path Correction Mechanism (Beam Profiling)
9. Embodiment 4: Laser Apparatus Including Optical Path Correction Mechanism (Adjusting Position and Angle of Mirror)
10. Embodiment 5: Laser Apparatus Including Optical Path Correction Mechanism (Provided On Input Side of Slab Optical Amplifier)
11. Embodiment 6: Laser Apparatus Including Optical Path Correction Mechanism (Crystal-Slab Optical Amplifier)
12. Embodiment 7: Laser Apparatus Including Main Pulse Laser Device and Pre-Pulse Laser Device Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview

A laser apparatus used in an LPP type EUV light generation system may be a pulse laser apparatus for outputting a pulse laser beam. The pulse laser apparatus may be an MOPA-type laser apparatus including a master oscillator (MO) for outputting a short-pulsed laser beam at a high repetition rate and at least one optical amplifier (PA). The optical amplifier may be a slab optical amplifier capable of multipass amplification.

The inventors have found that the optical path of the laser beam amplified by the slab optical amplifier may start varying immediately after activation of the optical amplifier. The inventors have found that the variation in the optical path is larger particularly in the directions within the plane where the laser beam travels in the slab optical amplifier. The inventors have found that, more particularly, the in-plane translational variation in the optical path is larger and the in-plane angular variation in the optical path is smaller. Since the optical path of the laser beam amplified by the slab optical amplifier varies, the laser beam may fail to enter the next device along a proper path, so that the power of the pulse laser beam outputted from the laser apparatus may be lowered.

In an aspect of the present disclosure, the laser apparatus may include an oscillator for outputting a laser beam and a slab optical amplifier for amplifying and outputting the laser beam received from the oscillator. The laser apparatus may further include a mirror that is disposed on the optical path of the laser beam to be inputted to the slab optical amplifier or the laser beam to be outputted from the slab optical amplifier and is capable of moving in a direction parallel to the plane where the laser beam travels in the slab optical amplifier. The one aspect of the present invention may correct the optical path varied in the slab optical amplifier.

2. Terms

Terms used in the present disclosure will be described hereinafter. A "slab optical amplifier" is an optical amplifier having an optical amplification region shaped like a slab. There is no limitation for the medium for the slab optical amplifier; the medium may be gaseous or solid. A "free-space direction" is a given direction parallel to the plane where the laser beam travels in the optical amplification region. A "waveguide direction" is a direction normal to the plane where the laser beam travels in the optical amplification region and is perpendicular to any free-space direction. A "high reflectance mirror" is a mirror capable of reflecting light having a specific wavelength at an intended reflectance. An "activation time" of a slab optical amplifier is a time when the slab optical amplifier gets ready to amplify an incoming laser beam.

3. Overview of EUV Light Generation System

3.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26.

The chamber 2 may be sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole formed in its wall, a window 21 may be installed in the through-hole, and the pulse laser beam 32 from the laser apparatus 3 may travel through the window 21. An EUV collector mirror 23 having a spheroidal surface may, for example, be provided in the chamber 2. The EUV collector mirror 23 may have a first focus and a second focus.

The EUV collector mirror 23 may have a multi-layered reflective film including alternately laminated molybdenum layers and silicon layers formed on the surface thereof. The EUV collector mirror 23 is preferably positioned such that the first focus lies in a plasma generation region 25 and the second focus lies in an intermediate focus (IF) region 292. The EUV collector mirror 23 may have a through-hole 24 formed at the center thereof and a pulse laser beam 33 may travel through the through-hole 24.

The EUV light generation apparatus 1 may include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture may be provided in the connection part 29. The wall 291 may be positioned such that the second focus of the EUV collector mirror 23 lies in the aperture.

The EUV light generation apparatus 1 may also include a laser beam direction control unit 34, a laser beam focusing mirror 22, and a target collector 28 for collecting targets 27. The laser beam direction control unit 34 may include an optical element for defining the direction and an actuator for adjusting the position, the orientation or posture, and the like of the optical element.

3.2 Operation

With reference to FIG. 1, a pulse laser beam 31 outputted from the laser apparatus 3 may pass through the laser beam direction control unit 34 and, as the pulse laser beam 32, travel through the window 21 and enter the chamber 2. The pulse laser beam 32 may travel inside the chamber 2 along at least one beam path, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam, the target 27 may be turned into plasma, and rays of light 251 may be emitted from the plasma.

The EUV light 252 included in the light 251 may be reflected selectively by the EUV collector mirror 23. EUV light 252 reflected by the EUV collector mirror 23 may be focused at the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control: the timing when the target 27 is outputted and the direction into which the target 27 is outputted, for example.

Furthermore, the EUV light generation controller 5 may be configured to control at least one of: the timing when the laser apparatus 3 oscillates, the direction in which the pulse laser beam 33 travels, and the position at which the pulse laser beam 33 is focused. It will be appreciated that the various controls mentioned above are merely examples, and other controls may be added as necessary.

4. Comparative Example of Laser Apparatus Including Master Oscillator and Optical Amplifiers

4.1 Configuration

Figure 2:
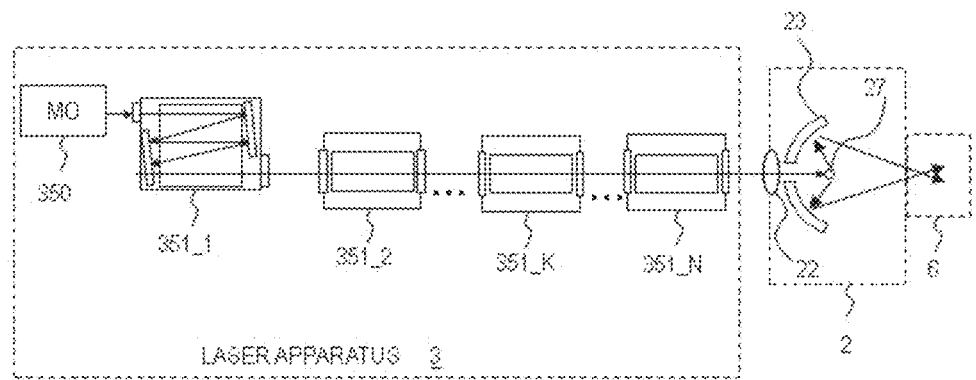
FIG. 2 schematically illustrates a comparative example of a laser apparatus.

FIG. 2 schematically illustrates a comparative example of a laser apparatus. The laser apparatus 3 may include a master oscillator (MO) 350 and optical amplifiers 351_1 to 351_N. The master oscillator 350 may be a laser oscillator including a Q-switch, a medium of $CO_2$ laser gas, and an optical resonator, for example. Alternatively, the master oscillator 350 may be a quantum-cascade laser (QCL) that oscillates at a wavelength in the gain range of the $CO_2$ laser. The pulse laser beam outputted from the master oscillator 350 may be a linearly-polarized beam.

The optical amplifiers 351_1 to 351_N may be disposed in series on the optical path of the pulse laser beam outputted from the master oscillator 350 and sequentially amplify the pulse laser beam outputted from the master oscillator 350. The optical amplifiers 351_1 to 351_N may be the first-stage to the Nth-stage optical amplifiers. The number of stages for the optical amplifiers may be one or more, which may be different depending on the design.

Each of the optical amplifiers 351_1 to 351_N may be a discharge-pumped optical amplifier employing $CO_2$ laser gas as medium. Each of the optical amplifiers 351_1 to 351_N may include $CO_2$ laser gas, a pair of electrodes, and a power supply to cause high-frequency discharge between the pair of electrodes. One or more of the optical amplifiers 351_1 to 351_N may be an optical amplifier to perform multipass amplification. The optical amplifier to perform multipass amplification may be a slab optical amplifier. In the example of FIG. 2, at least the optical amplifier 351_1 may be a slab optical amplifier.

In the case where the master oscillator 350 is a device for outputting a small power (in tens of milliwatts) like a QCL, a regenerative amplifier including an optical resonator, an EO (Electro-Optic) Pockels cell, and a polarizer may be provided at the upstream of the optical amplifier 351-1. An optical isolator may be provided at any or each of the places between the master oscillator 350 and the optical amplifier 351-1, between two adjacent optical amplifiers, and downstream of the optical amplifier 351_N on the optical path.

4.2 Operation of Laser Apparatus

Each of the optical amplifiers 351_1 to 351_N may apply a voltage between the electrodes with a not-shown power supply to cause electric discharge. The master oscillator 350 may produce laser oscillation with a predetermined cyclic frequency.

Each of the optical amplifiers 351_1 to 351_N may generate high frequency discharge with the not-shown power supply and pump the $CO_2$ laser gas. Eventually, the excitation intensity of each of the optical amplifiers 351_1 to 351_N may reach a specific level. The optical amplifiers 351_1 to 351_N may generate discharge between the electrodes to excite the $CO_2$ laser gas even when not receiving a pulse laser beam from the master oscillator 350.

The laser beam outputted from the master oscillator 350 may be amplified by entering and passing through the optical amplifier 351_1. The amplified laser beam outputted from the optical amplifier 351_1 may be further amplified by entering and passing through the optical amplifier 351_2. Likewise, the pulse laser beam outputted from the optical amplifier 351_K-1 (not shown) may be further amplified by entering and passing through the optical amplifier 351_K. The laser beam amplified by the optical amplifier 351_N may be collected by a laser beam focusing mirror 22 to hit a target 27 in the chamber 2.

The target 27 hit by the pulse laser beam may turn into plasma, which may radiate EUV light. The EUV light may be collected by the EUV collector mirror 23 and outputted to the exposure apparatus 6 connected with the chamber 2.

4.3 Configuration of Slab Optical Amplifier

Figure 3A:
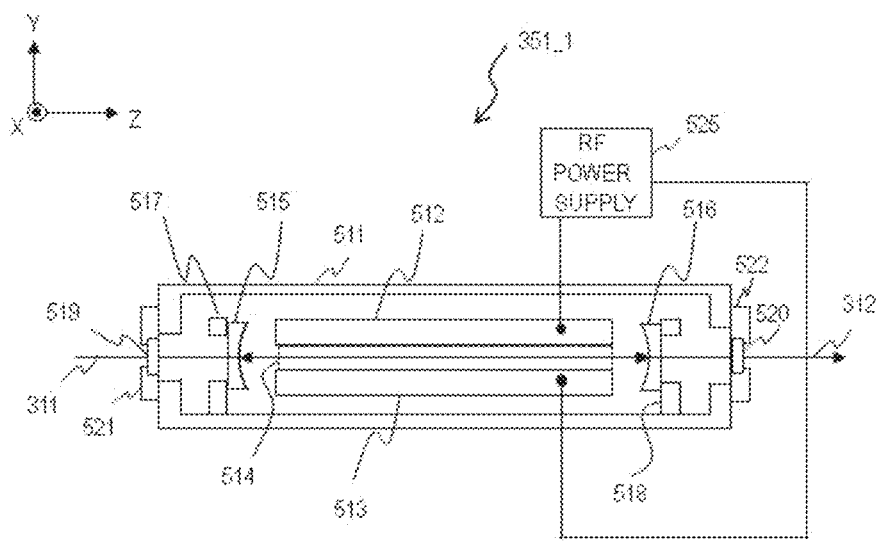
FIG. 3A schematically illustrates a configuration example of a slab optical amplifier.
Figure 3B:
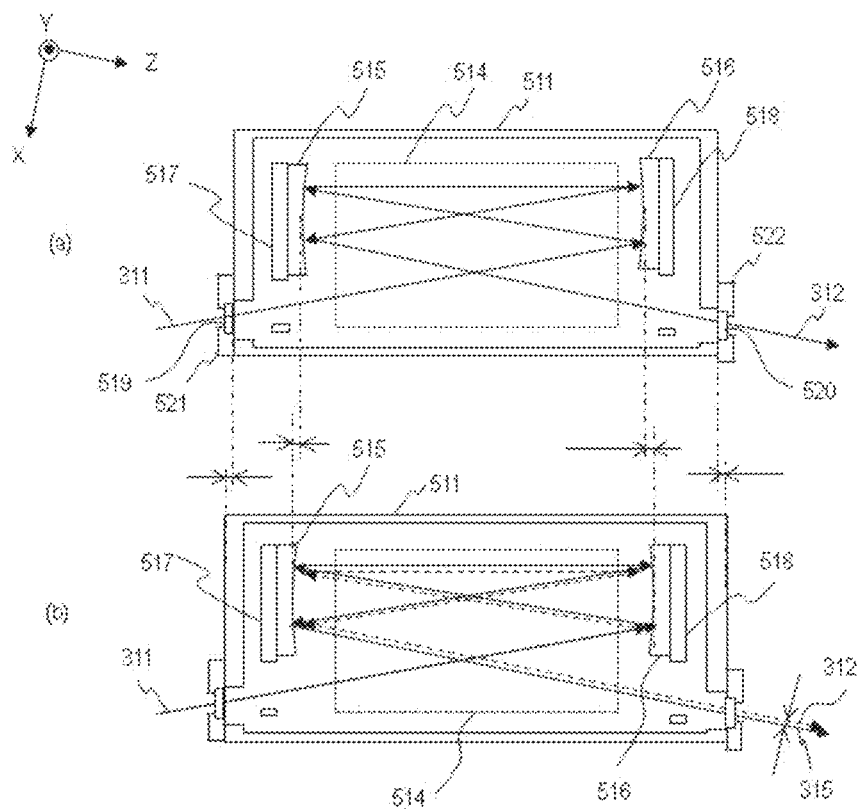
FIG. 3B schematically illustrates a configuration example of a slab optical amplifier.

FIGS. 3A and 3B schematically illustrate a configuration example of a slab optical amplifier. The slab optical amplifier may perform multipass amplification by repeatedly making the laser beam reflect off reflective faces opposed to each other for the laser beam to repeatedly pass through a slab amplification region.

In FIGS. 3A and 3B, the X-axis, the Y-axis, and the Z-axis may be perpendicular to one another. The Z-axis direction may be the same as the direction of the optical path of the laser beam emitted from the slab optical amplifier 351_1. The Y-axis direction may be the same as the waveguide direction. The waveguide direction may be the direction normal to the plane having the largest area in the slab amplification region 514. A given in-plane direction of the X-Z plane may be a free-space direction.

FIG. 3A is a cross-sectional diagram of the slab optical amplifier 351_1 as seen in the X-axis direction. FIG. 3B provides cross-sectional diagrams of the slab optical amplifier 351_1 as seen in the Y-axis direction. FIG. 3B illustrates the variation in optical path caused by thermal deformation of the slab optical amplifier 351_1.

FIG. 3B(a) shows the optical path in the slab optical amplifier 351_1 before thermal deformation. FIG. 3B(b) shows the optical path in the slab optical amplifier 351_1 before thermal deformation in dashed lines and shows the optical path in the slab optical amplifier 351_1 after thermal deformation in solid lines. In the illustration of the embodiments to be described hereinafter, the dashed arrows represent the original optical path and the solid arrows represent the optical path after being varied. The variation in optical path in the slab optical amplifier 351_1 will be described later.

The slab optical amplifier 351_1 may include a chamber 511 and an RF power supply 525. A holder 521 holding an entrance window 519 and a holder 522 holding an exit window 520 may be secured on the outer wall of the chamber 511.

A pair of planar electrodes 512 and 513 may be provided in the chamber 511 to be opposed to each other with a specific distance and the electrodes 512 and 513 may be electrically connected with the RF power supply 525. The Y-axis direction may be perpendicular to the wide faces of the electrodes 512 and 513 and the electrodes 512 and 513 may be disposed to be opposed to each other in the Y-axis direction. The wide faces of the electrodes 512 and 513 may be the widest faces of the electrodes 512 and 513. The RF power supply 525 may apply a voltage between the electrodes 512 and 513 to generate discharge in the discharge region 514 between the electrodes 512 and 513. The discharge region may correspond to the slab amplification region.

The discharge-side faces of the electrodes 512 and 513 perpendicular to the discharging direction may be referred to as discharge faces. The discharge faces of the electrodes 512 and 513 may be parallel to each other. The discharging direction may be the Y-axis direction, namely, the waveguide direction. The free-space directions may be parallel to the discharge faces of the electrodes 512 and 513.

$CO_2$ laser gas may be enclosed in the chamber 511. The holder 521 holding the entrance window 519 and the holder 522 holding the exit window 520 may be respectively provided at a position on the optical path 311 of the incoming beam and a position on the optical path 312 of the amplified outgoing beam to seal the chamber 511.

In the chamber 511, concave mirrors 515 and 516 are disposed to be opposed to each other across the discharge region 514. The concave mirrors 515 and 516 may be high reflectance mirrors. The concave mirrors 515 and 516 may be opposed to each other in a free-space direction.

The concave mirror 515 may be held by a mirror holder 517 and the concave mirror 516 may be held by a mirror holder 518. The mirror holders 517 and 518 may be secured to the inner wall of the chamber 511. The concave mirrors 515 and 516 may be disposed so that the laser beam entering from the entrance window 519 will travel in zig-zags to multipass through the discharge region 514 and exit from the exit window 520.

4.4 Operation of Slab Optical Amplifier

In FIG. 3B(a), the laser beam may enter the slab optical amplifier 351_1 along an optical path 311 and be amplified in the discharge region 514. The slab optical amplifier 351_1 may output the amplified laser beam along an optical path 312. The slab optical amplifier 351_1 may apply a voltage between the electrodes 512 and 513 with the RF power supply 525, which may cause discharge between the electrodes 512 and 513 to excite the $CO_2$ laser gas.

Under the foregoing condition, a pulsed laser beam may enter the chamber 511 through the entrance window 519 along the optical path 311. The laser beam may pass through the discharge region 514 while being amplified and reach the concave mirror 516. The amplified laser beam may reflect off the concave mirror 516, pass through the discharge region 514 while being amplified again, and reach the concave mirror 515.

The amplified laser beam may reflect off the concave mirror 515, pass through the discharge region 514 while being amplified again, and reach the concave mirror 516. The laser beam repeatedly reflecting off the concave mirrors 515 and 516 may travel through the discharge region 514 in zig-zags to be multipass-amplified. In FIG. 3B, the number of passes may be five.

The laser beam amplified in the last fifth pass may be outputted through the exit window 520 along the optical path 312. The outgoing beam outputted through the exit window 520 may enter the device at the next stage. The beam entering the slab optical amplifier may be the laser beam outputted by the master oscillator 350 or the laser beam amplified by an optical amplifier at a stage previous to the slab optical amplifier.

5. Issues of Laser Apparatus of Comparative Example

When the RF power supply 525 keeps generating discharge between the electrodes 512 and 513, the chamber 511 may be deformed because of the heat caused by the discharge. The inventors have found that the deformation of the chamber 511 may move the optical path 312 of the outgoing beam largely in a free-space direction and particularly, the translational component in the free-space direction may be larger.

For example, as illustrated in FIG. 3B(b), the expansion of the chamber 511 may move the concave mirrors 515 and 516 secured to the chamber 511 with the mirror holders 517 and 518; the distance between the concave mirrors 515 and 516 may increase.

With increase in the distance between the concave mirrors 515 and 516, the reflection points of the laser beam incident on these concave mirrors may be displaced. As a result, the optical path of the outgoing beam emitted from the slab optical amplifier 351_1 may be translated in a free-space direction in the X-Z plane. In FIG. 3B(b), the optical path of the outgoing beam may be translated from the optical path 312 to the optical path 315. For this reason, the laser beam may fail to enter the next device along the proper optical path.

For example, if the outgoing beam translated in the optical path is to be further amplified by the next optical amplifier 351_2, vignetting of the laser beam may occur at the entrance of the next optical amplifier 351_2 or along the optical path inside the next optical amplifier 351_2. As a result, a part or all of the amplified beam may not be emitted from the next optical amplifier 351_2 to lower the amplification rate of the laser apparatus 3; the laser apparatus 3 may not be able to function appropriately.

To correct the optical path translated in a free-space direction, an optical path correction mechanism may be employed that adjusts the angle of a high reflectance mirror. However, this optical path correction mechanism may require at least two angle-adjustable high reflectance mirrors.

Figure 4:
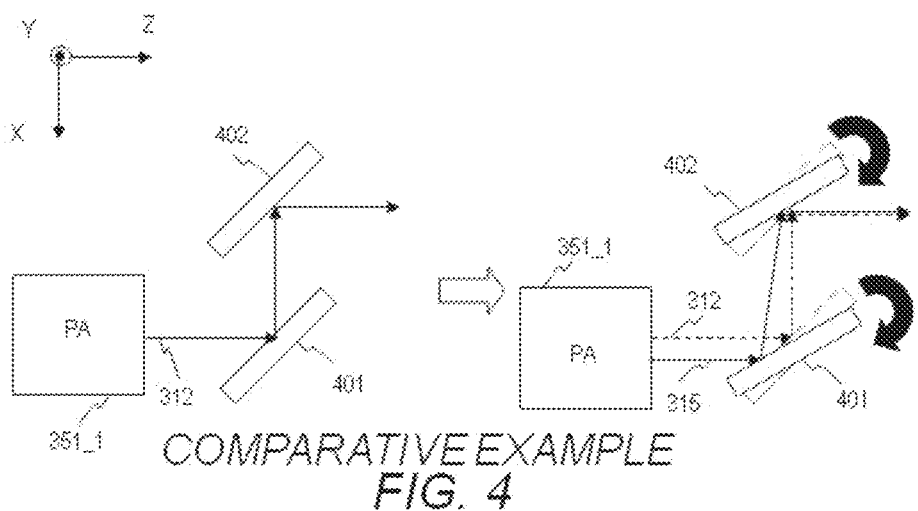
FIG. 4 schematically illustrates a comparative example of a method of correcting an optical path varied in a slab optical amplifier.

FIG. 4 illustrates an example of angle adjustment with two high reflectance mirrors to correct an optical path translated in a free-space direction. In FIG. 4, the beam emitted from the slab optical amplifier 351_1 may reflect off a first high reflectance mirror 401 and then reflect off a second high reflectance mirror 402. The optical path may be corrected by adjusting the angles of the two high reflectance mirrors 401 and 402.

In FIG. 4, the optical path of the beam emitted from the slab optical amplifier 351_1 may vary from the optical path 312 to the optical path 315. In FIG. 4, the angles of the two high reflectance mirrors 401 and 402 may be varied clockwise. As a result, the optical paths of the beams reflected by the high reflectance mirror 402 may be the same in the cases of the optical paths 312 and 315. However, this optical path correction mechanism may require precise adjustment of the angles of the two high reflectance mirrors 401 and 402 separately; complex control may be requested.

6. Embodiment 1: Laser Apparatus Including Optical Path Correction Mechanism

Controlling Mirror by Optical Path Correction Mechanism

6.1 Configuration of Laser Apparatus

Figure 5:
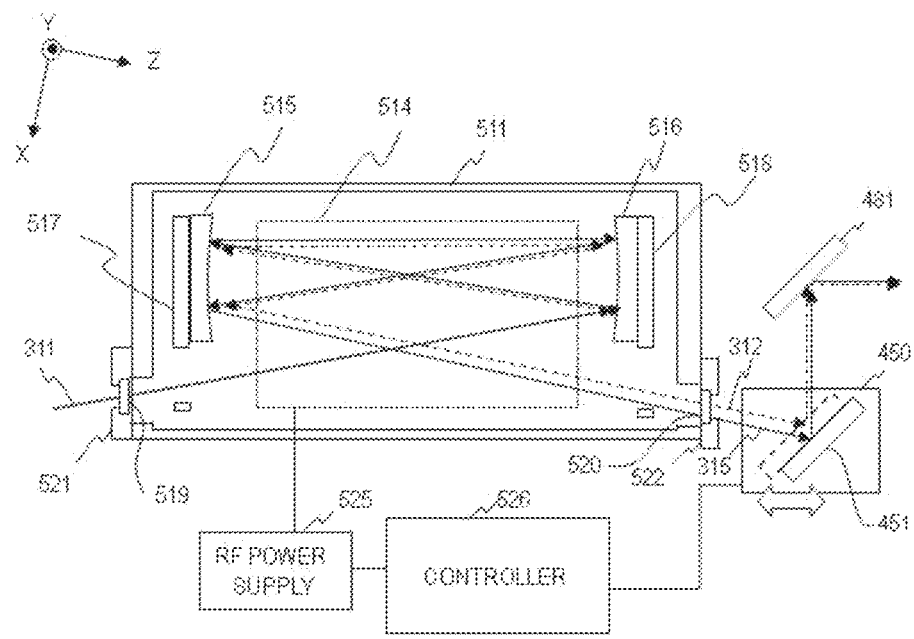
FIG. 5 schematically illustrates a configuration of a part of a laser apparatus including an optical path correction mechanism in Embodiment 1.

FIG. 5 schematically illustrates a configuration of a part of a laser apparatus 3 in Embodiment 1. The laser apparatus 3 in the present embodiment may include the configuration illustrated in FIG. 5 in the laser apparatus configuration illustrated in FIG. 2. The laser apparatus 3 may include an optical path correction mechanism 450 disposed on the optical path of the laser beam outputted from the slab optical amplifier 351_1 and a high reflectance mirror 481 disposed downstream of the optical path correction mechanism 450. The position and the tilt of the high reflectance mirror 481 may be fixed and the high reflectance mirror 481 may be optional.

The optical path correction mechanism 450 may be disposed on the optical path of the laser beam between the slab optical amplifier 351_1 and the next-stage optical device and correct the optical path of the laser beam. The next-stage optical device may be an optical isolator or an optical amplifier 351_2.

A controller 526 may be electrically connected with the RF power supply 525 and the optical path correction mechanism 450. The controller 526 may include a processor to operate in accordance with a program stored in a memory and/or a hardware logic circuit. The controller 526 may include a timer implemented by the processor or a dedicated circuit.

The optical path correction mechanism 450 may include a high reflectance mirror 451. The high reflectance mirror 451 may reflect the beam emitted from the slab optical amplifier 351_1 and the high reflectance mirror 481 may reflect the laser beam reflected by the high reflectance mirror 451. The incident angles of the laser beam on the high reflectance mirrors 451 and 481 may be approximately 45°, but is not limited to this.

The optical path correction mechanism 450 may be structured to translate the high reflectance mirror 451 along one axis in accordance with an instruction from the controller 526. The optical path correction mechanism 450 may move the high reflectance mirror 451 in a specific free-space direction.

6.2. Operation of Laser Apparatus

As described above, the optical path in the slab optical amplifier 351_1 may move because of the thermal deformation of the slab optical amplifier 351_1 caused by electric discharge. The controller 526 may move the high reflectance mirror 451 based on the time elapsed since the start of the discharge. The start time of discharge may be the activation time.

For example, the controller 526 may detect start of discharge with a signal from the RF power supply 525 and measure the time elapsed since the start time of the discharge detected by the timer. The controller 526 may instruct the optical path correction mechanism 450 about the amount to move the high reflectance mirror 451 from the initial position based on the time measured by the timer.

The controller 526 may hold relational information on the relation between the time measured by the timer and the amount to move the high reflectance mirror 451 from the initial position. The relational information may be expressed by a table or a function, for example. The relational information may be the results obtained in preparatory measurement. In general, the amount to move the high reflectance mirror 451 from the initial position may increase upon start of discharge and be maintained at a fixed value after a certain time has elapsed.

The optical path correction mechanism 450 may move the high reflectance mirror 451 in accordance with the instruction of the controller 526. The optical path correction mechanism 450 may move the high reflectance mirror 451 so that the optical path of the beam reflected by the high reflectance mirror 451 will be fixed. In FIG. 5, the optical path of the beam emitted from the slab optical amplifier 351_1 may be the optical path 312 at the start of discharge and vary with time to the optical path 315. The optical path correction mechanism 450 may translate the high reflectance mirror 451 to downstream of the outgoing beam in a specific free-space direction as the optical path varies.

The controller 526 may further detect the end of the discharge with a signal from the RF power supply 525 and instruct the optical path correction mechanism 450 to move the high reflectance mirror 451 to the initial position. The optical path correction mechanism 450 may move the high reflectance mirror 451 to the initial position in accordance with the instruction from the controller 526.

6.3 Configuration and Operation of Optical Path Correction Mechanism

Figure 6A:
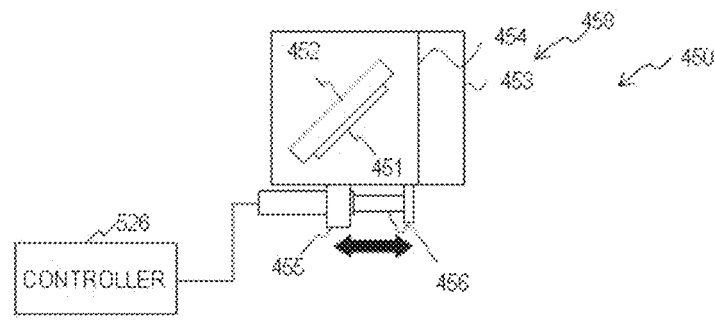
FIG. 6A schematically illustrates a configuration of the optical path correction mechanism in Embodiment 1.
Figure 6B:
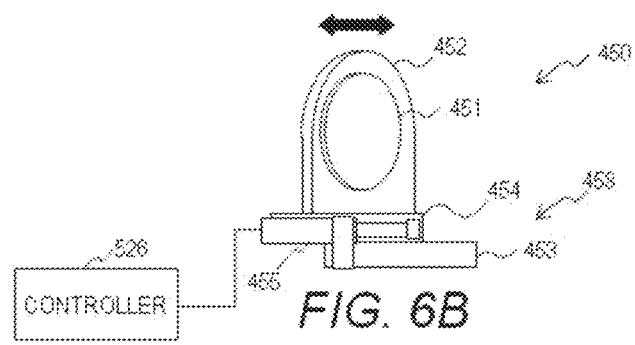
FIG. 6B schematically illustrates a configuration of the optical path correction mechanism in Embodiment 1.

FIGS. 6A and 6B schematically illustrate a configuration of the optical path correction mechanism 450. FIG. 6A is a top plan view and FIG. 6B is a side view. The optical path correction mechanism 450 may include a high reflectance mirror 451, a mirror holder 452, a one-axial stage 458, and a translational actuator 455. The one-axial stage 458 may include a mount 453 to be secured and a movable part 454 provided to be movable on the mount 453. The movable part 454 may be movable on the mount 453 along one axis in the both directions.

The mirror holder 452 may hold the high reflectance mirror 451. The mirror holder 452 may have a gimbal mechanism for fine adjustment of the angle of holding the high reflectance mirror 451. The mirror holder 452 may be secured to the movable part 454. The high reflectance mirror 451 held by the mirror holder 452 may reflect a laser beam with high reflectance.

The translational actuator 455 may have an arm 456 displaceable linearly. The arm 456 may be secured to the movable part 454 and translate the movable part 454 with respect to the mount 453 in the one-axial directions. In another configuration, the arm 456 may be in contact with the movable part 454; a spring attached to the mount 453 may apply force to the movable part 454 so that the movable part 454 will be consistently in contact with the arm 456. The translational actuator 455 may be electrically connected with the controller 526 and driven by a signal of the controller 526. The translational actuator 455 may have a built-in encoder for measuring the amount of displacement of the arm 456 from the initial position and send the measured amount of displacement to the controller 526.

6.4 Directions of Moving Mirror by Optical Path Correction Mechanism

Figure 7A:
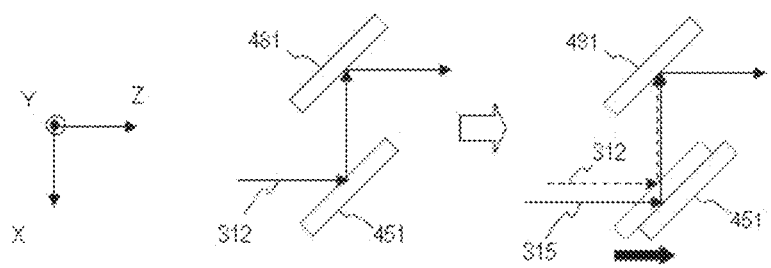
FIG. 7A schematically illustrates an example of a way to move a high reflectance mirror to correct an optical path in Embodiment 1.
Figure 7B:
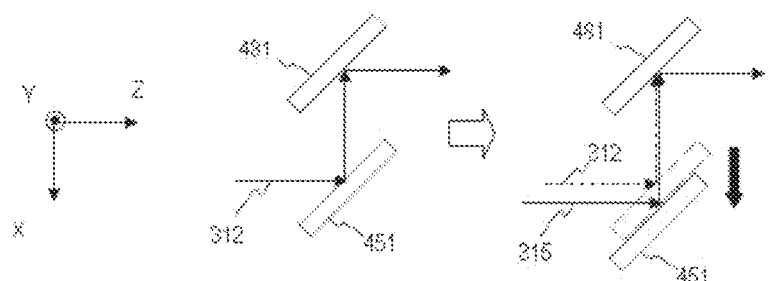
FIG. 7B schematically illustrates an example of a way to move a high reflectance mirror to correct an optical path in Embodiment 1.
Figure 7C:
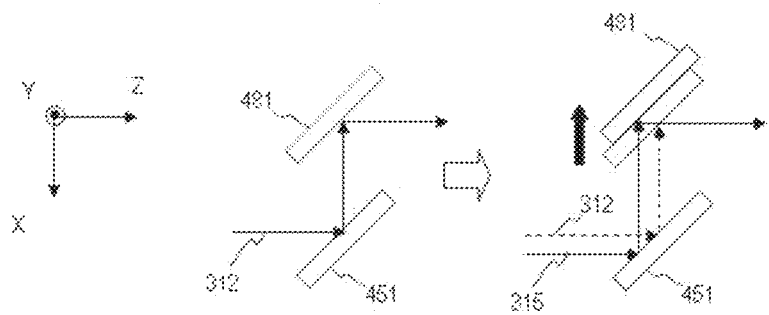
FIG. 7C schematically illustrates an example of a way to move a high reflectance mirror to correct an optical path in Embodiment 1.
Figure 7D:
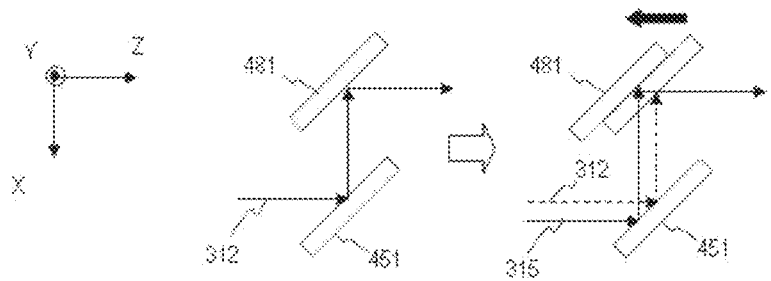
FIG. 7D schematically illustrates an example of a way to move a high reflectance mirror to correct an optical path in Embodiment 1.

FIGS. 7A and 7B illustrate examples of ways of moving the high reflectance mirror 451 by the optical path correction mechanism 450. FIGS. 7C and 7D illustrate examples of ways of moving the high reflectance mirror 481, instead of the high reflectance mirror 451.

The optical path correction mechanism 450 may translate the high reflectance mirror 451 along a specific free-space direction. The specific free-space direction may be a direction parallel to the discharge faces of the electrodes 512 and 513 of the slab optical amplifier 351_1 or a direction in the X-Z plane.

As the optical path of the incident beam on the high reflectance mirror 451 varies, the optical path correction mechanism 450 may move the high reflectance mirror 451 in the specific free-space direction so that the optical path of the beam reflected by the high reflectance mirror 451 will be fixed.

In FIGS. 7A and 7B, the optical path of the beam incident on the high reflectance mirror 451 may vary from the optical path 312 to the optical path 315. The high reflectance mirror 451 therefore may move in parallel to the incident direction of the incident beam as illustrated in FIG. 7A. The high reflectance mirror 451 may move vertically to the incident direction of the incident beam as illustrated in FIG. 7B. The high reflectance mirror 451 may move in a direction including a component vertical to and a component parallel to the incident direction of the incident beam.

As illustrated in FIGS. 7C and 7D, the optical path correction mechanism 450 may include a high reflectance mirror 481 instead of the high reflectance mirror 451. The position and the tilt of the high reflectance mirror 451 may be fixed. As the optical path of the incident beam varies, the high reflectance mirror 481 may translate in a specific free-space direction so that the optical path of the beam reflected by the high reflectance mirror 481 will be fixed.

The high reflectance mirror 481 may move in parallel to the incident direction of the incident beam as illustrated in FIG. 7C. The high reflectance mirror 481 may move vertically to the incident direction of the incident beam as illustrated in FIG. 7D. The high reflectance mirror 481 may move in a direction including a component vertical to and a component parallel to the incident direction of the incident beam.

As described above, the present embodiment may appropriately correct the optical path varied in a slab optical amplifier. The optical path may be corrected by moving a high reflectance mirror in a free-space direction with a simple configuration and easy control.

7. Embodiment 2: Laser Apparatus Including Optical Path Correction Mechanism (Temperature Detection)

Hereinafter, a laser apparatus in Embodiment 2 is described. In the present embodiment, differences from Embodiment 1 are mainly described.

7.1 Configuration

Figure 8:
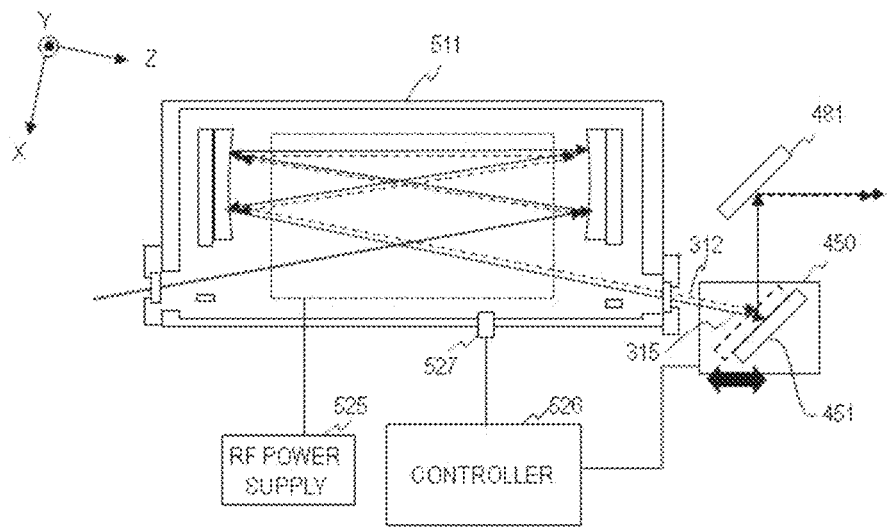
FIG. 8 schematically illustrates a configuration example of a part of a laser apparatus including an optical path correction mechanism in Embodiment 2.

FIG. 8 schematically illustrates a configuration of a part of a laser apparatus 3 in the present embodiment. The laser apparatus 3 may include a temperature sensor 527 for measuring the temperature of the slab optical amplifier 351_1. The temperature sensor 527 may be secured to the outer wall or the inner wall of the chamber 511, for example.

The controller 526 may be electrically connected with the temperature sensor 527. The controller 526 does not need to be electrically connected with the RF power supply 525. The controller 526 does not need to include a timer.

7.2 Operation

The temperature sensor 527 may detect the temperature of the wall of the chamber 511 and output the result to the controller 526. The controller 526 may instruct the optical path correction mechanism 450 of the position to move the high reflectance mirror 451 based on the temperature detected by the temperature sensor 527.

The optical path correction mechanism 450 may move the high reflectance mirror 451 in accordance with the instruction from the controller 526. The optical path correction mechanism 450 may translate the high reflectance mirror 451 in a specific free-space direction so that the optical path of the beam reflected by the high reflectance mirror 451 will be fixed.

The controller 526 may instruct the optical path correction mechanism 450 about the amount to move the high reflectance mirror 451 from the initial position based on the temperature detected by the temperature sensor 527. The optical path correction mechanism 450 may move the high reflectance mirror 451 based on the instruction from the controller 526.

The controller 526 may hold relational information on the relation between the temperature to be detected by the temperature sensor 527 and the amount to move the high reflectance mirror 451 from the initial position. The relational information may be expressed by a table or a function, for example. The relational information may be the measurement results obtained in preparatory measurement.

7.3 Modification

Instead of using the temperature sensor 527, the controller 526 may estimate the temperature of the chamber 511 from an operating parameter of the RF power supply 525. The operating parameter may be RF voltage or duty, for example. The controller 526 may be electrically connected with the RF power supply 525 to acquire a value of the operating parameter from the RF power supply 525.

The controller 526 may hold relational information on the relation between the value of the operating parameter and the temperature of the chamber 511. The controller 526 may hold relational information on the relation between the value of the operating parameter and the amount to move the high reflectance mirror 451 from the initial position. The relational information may be the measurement results obtained in preparatory measurement. The controller 526 may issue an instruction about the amount to move the high reflectance mirror 451 from the initial position based on the stored relational information and the value of the operating parameter acquired from the RF power supply 525.

The present embodiment may correct the optical path varying because of thermal deformation of the slab optical amplifier 351_1 more precisely by controlling the position of the high reflectance mirror 451 based on the temperature of the slab optical amplifier 351_1.

8. Embodiment 3: Laser Apparatus Including Optical Path Correction Mechanism (Beam Profiling)

Hereinafter, a laser apparatus in Embodiment 3 is described. In the present embodiment, differences from Embodiment 1 are mainly described.

8.1 Configuration

Figure 9:
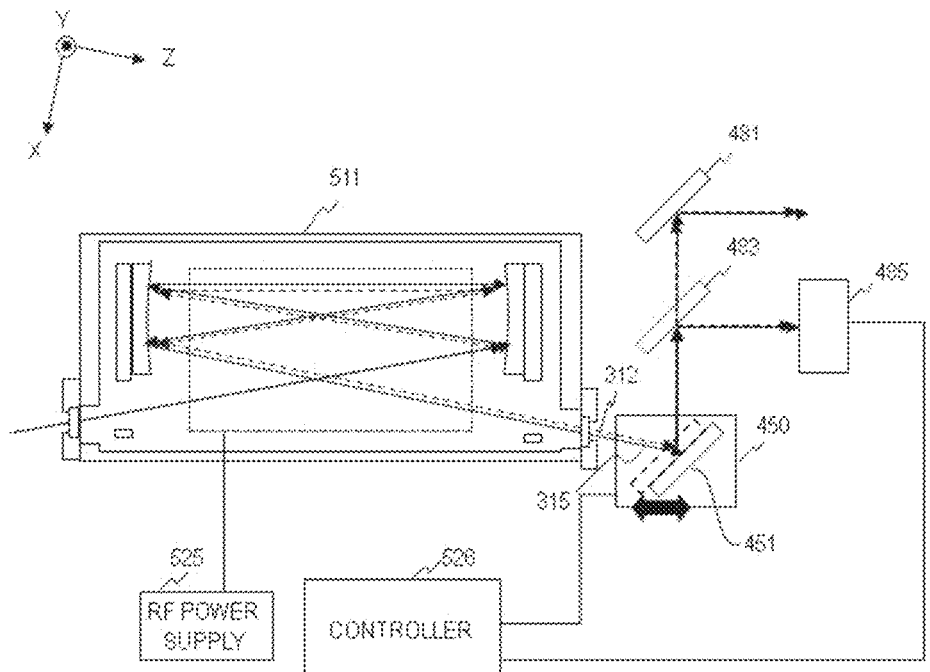
FIG. 9 schematically illustrates a configuration example of a part of a laser apparatus including an optical path correction mechanism in Embodiment 3.

FIG. 9 schematically illustrates a configuration of a part of a laser apparatus 3 in the present embodiment. The laser apparatus 3 may include a beam sampler 483 provided downstream of the optical path correction mechanism 450. The beam sampler 483 may be disposed on the optical path between the optical path correction mechanism 450 and the high reflectance mirror 481 or downstream of the high reflectance mirror 481. The beam sampler 483 may reflect a part of the laser beam reflected by the high reflectance mirror 451 as a sample beam and transmit the other components therethrough.

The laser apparatus 3 may include a beam profiler 485 disposed at a place to receive the sample beam from the beam sampler 483. Any type of beam profiler may be used for the beam profiler 485. For example, a camera-based beam profiler or a slit-based beam profiler may be used. The controller 526 may be electrically connected with the beam profiler 485 and the optical path correction mechanism 450. The controller 526 does not need to be electrically connected with the RF power supply 525. The controller 526 does not need to include a timer.

8.2 Operation

The controller 526 may preparatorily store the position of the beam on the correct optical path from the slab optical amplifier 351_1. For example, when the slab optical amplifier 351_1 does not discharge, the controller 526 may acquire image data representing a beam profile of the laser beam outputted from the master oscillator 350 from the beam profiler 485. The controller 526 may store the acquired beam profile as a beam profile of the correct optical path.

The controller 526 may calculate a position of the correct beam profile in the image. For example, the controller 526 may calculate the position of the centroid of the correct beam profile and store the coordinates of the centroid in the image as the beam position on the correct optical path.

After start of discharging in the slab optical amplifier 351_1, the beam sampler 483 may reflect a part of the laser beam reflected by the high reflectance mirror 451 to the beam profiler 485 as a sample beam. The beam profiler 485 may observe the beam profile of the received laser beam and output the observed image data to the controller 526.

For example, the controller 526 may acquire the data of the beam profile from the beam profiler 485 in a predetermined cycle and perform the following processing repeatedly. The controller 526 may stop the following processing when a predetermined time has passed since the start of discharging.

The controller 526 may calculate a position of the beam profile observed by the beam profiler 485 in the image. For example, the controller may calculate the centroid in the image from the observed beam profile and store the coordinates of the centroid in the image as the position of the observed beam on the current optical path.

The controller 526 may calculate the displacement amount (difference) between the coordinates of the position of the beam on the correct optical path and the coordinates of the position of the observed beam. The controller 526 may instruct the optical path correction mechanism 450 to move the high reflectance mirror 451 based on the calculated displacement amount. The optical path correction mechanism 450 may move the high reflectance mirror 451 in accordance with the instruction of the controller 526.

The controller 526 may send an instruction to translate the high reflectance mirror 451 to reduce the displacement amount of the beam position to be close to zero to the optical path correction mechanism 450. For example, the controller 526 may hold relational information on the relation between the displacement amount of the beam position and the amount to move the high reflectance mirror 451. Each of the displacement amount and the amount to move may take a positive value or a negative value depending on the direction. The relational information may be expressed by a table or a function, for example.

The present embodiment may correct the optical path varying because of the slab optical amplifier 351_1 more precisely by controlling the position of the high reflectance mirror 451 based on the position of the beam reflected by the high reflectance mirror 451.

9. Embodiment 4: Laser Apparatus Including Optical Path Correction Mechanism

ADJUSTING POSITION AND ANGLE OF MIRROR

Hereinafter, a laser apparatus in Embodiment 4 is described. In the present embodiment, differences from Embodiment 3 are mainly described.

9.1 Configuration of Laser Apparatus

The optical path correction mechanism in the present embodiment may compensate for the translational variation and the angular variation in optical path in free-space directions. The optical path correction mechanism in the present embodiment may translate the high reflectance mirror and further, adjust the angle of the high reflectance mirror to compensate for the variation in optical path in the slab optical amplifier.

Figure 10:
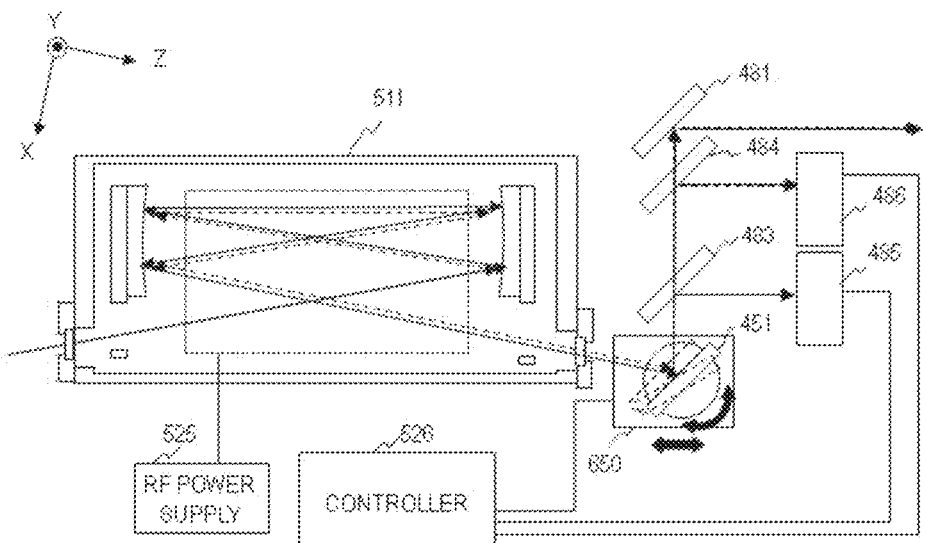
FIG. 10 schematically illustrates a configuration example of a part of a laser apparatus including an optical path correction mechanism in Embodiment 4.

FIG. 10 schematically illustrates a configuration of a part of a laser apparatus 3 in the present embodiment. The laser apparatus 3 may include an optical path correction mechanism 650 in place of the optical path correction mechanism 450 in Embodiment 3. The laser apparatus 3 may include a beam sampler 484 downstream of the beam sampler 483. The laser apparatus 3 may include two beam samplers 483 and 484 disposed in series downstream of the optical path correction mechanism 650.

The laser apparatus 3 may include a beam profiler 486 disposed at a place to receive a sample beam from a beam sampler 484. The beam profiler 486 may be any type of beam profiler; the beam profiler 486 may be the same type as the beam profiler 485 or a different type. The controller 526 may be electrically connected with the beam profiler 486 and the optical path correction mechanism 650, in addition to the beam profiler 485.

9.2 Configuration of Optical Path Correction Mechanism

Figure 11A:
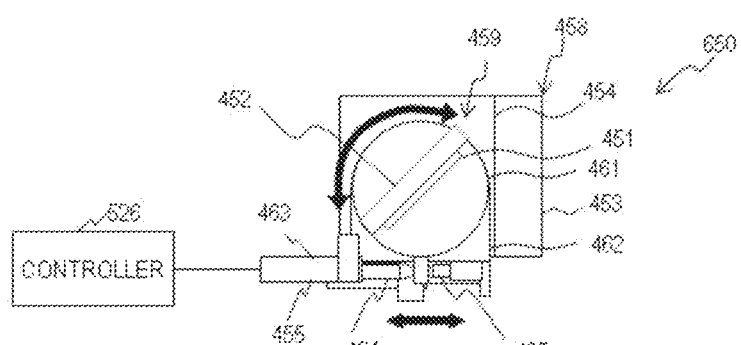
FIG. 11A schematically illustrates a configuration of the optical path correction mechanism in Embodiment 4.
Figure 11B:
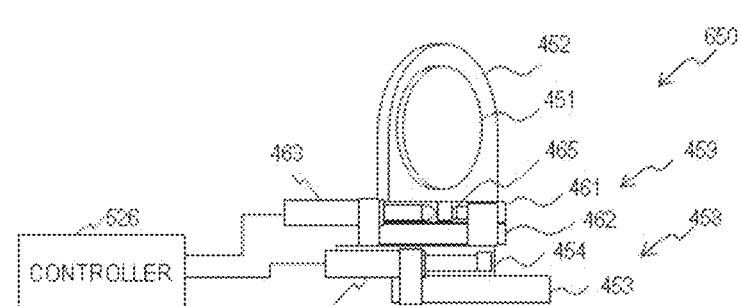
FIG. 11B schematically illustrates a configuration of the optical path correction mechanism in Embodiment 4.

FIGS. 11A and 11B schematically illustrate a configuration of the optical path correction mechanism 650. FIG. 11A is a top plan view and FIG. 11B is a side view. The optical path correction mechanism 650 may include a high reflectance mirror 451, a mirror holder 452, a one-axial stage 458, a translational actuator 455, a rotatable stage 459, and a translational actuator 463.

The one-axial stage 458 and the translational actuator 455 may have the same configurations as those in Embodiment 3. The rotatable stage 459 may be provided on the one-axial stage 458. The mirror holder 452 may be provided on the rotatable stage 459. The high reflectance mirror 451 and the mirror holder 452 may have the same configurations as those in Embodiment 3.

The rotatable stage 459 may include a mount 462 secured to the movable part 454 of the one-axial stage 458 and a rotatable part 461 rotatably provided on the mount 462. The mirror holder 452 may be secured to the rotatable part 461. The rotational axis of the rotatable part 461 may be included in the reflective plane of the high reflectance mirror 451.

The translational actuator 463 may have an arm 464 displaceable linearly. The arm 464 may be in contact with the rotatable part 461 of the rotatable stage 459 to rotate the rotatable part 461 with respect to the mount 462. The optical path correction mechanism 650 may include a spring plunger 465. The spring plunger 465 may apply force to the rotatable part 461 so that the arm 464 of the translational actuator 463 will be consistently in contact with the rotatable part 461.

The translational actuator 463 may be connected with the controller 526 and driven by a signal of the controller 526. The translational actuator 463 may have a built-in encoder for measuring the amount of displacement of the arm 464 from the initial position and send the measured amount of displacement of the arm 464 to the controller 526.

9.3 Operation

The controller 526 may preparatorily store the position of the beam on the correct optical path from the slab optical amplifier 351_1 for each of the beam profilers 485 and 486.

Figure 12A:
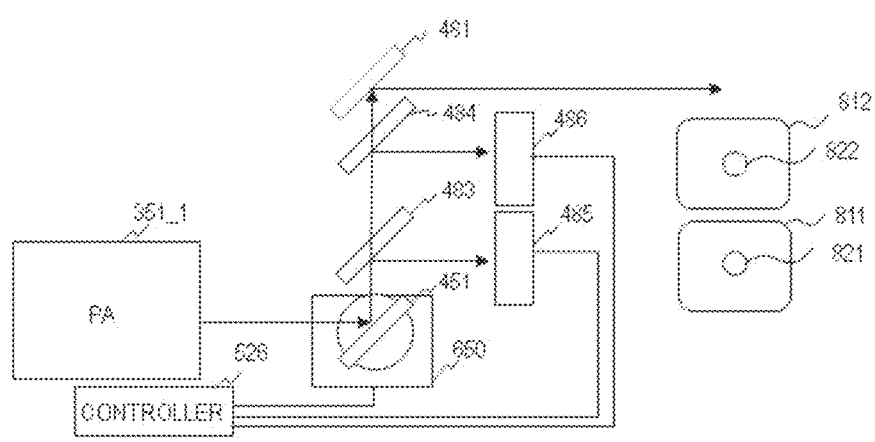
FIG. 12A schematically illustrates beam profiles of a correct optical path in Embodiment 4.

FIG. 12A shows images 811 and 812 observed by the beam profilers 485 and 486 and beam profiles 821 and 822 of the correct path.

For example, when the slab optical amplifier 351_1 does not discharge, the controller 526 may acquire data of observed images 811 and 812 of the laser beam outputted by the master oscillator 350 from the beam profilers 485 and 486. The observed images 811 and 812 may include beam profiles 821 and 822. The controller 526 may store the acquired beam profiles as beam profiles of the correct optical path.

The controller 526 may calculate the positions of the correct beam profiles 821 and 822 in the images 811 and 812 for the beam profilers 485 and 486. For example, the controller 526 may calculate the position of the centroid of the correct beam profile 821 acquired from the beam profiler 485 and store the coordinates of the centroid in the image 811 as the beam position on the correct optical path for the beam profiler 485.

Furthermore, the controller 526 may calculate the position of the centroid of the correct beam profile 822 acquired from the beam profiler 486 and store the coordinates of the centroid in the image 812 as the position of the beam on the correct optical path for the beam profiler 486.

After start of discharging in the slab optical amplifier 351_1, the beam sampler 483 may reflect a part of the laser beam reflected by the high reflectance mirror 451 to the beam profiler 485 as a sample beam. The beam profiler 485 may observe the beam profile of the received laser beam and output the observed data to the controller 526.

The beam sampler 484 may reflect a part of the laser beam transmitted through the beam sampler 483 to the beam profiler 486 as a sample beam. The beam profiler 486 may observe the beam profile of the received laser beam and output the observed data to the controller 526.

Figure 12B:
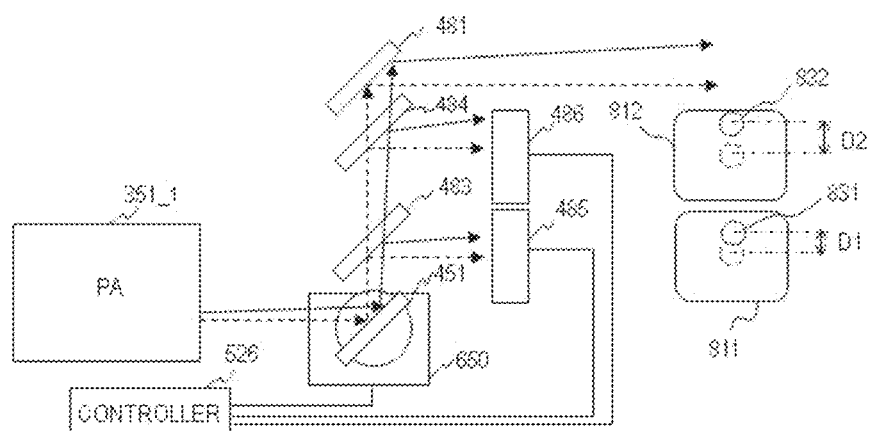
FIG. 12B schematically illustrates beam profiles of a varied optical path in Embodiment 4.

The controller 526 may repeatedly acquire the data of beam profiles from the beam profilers 485 and 486 and repeat the following processing. FIG. 12B shows beam profiles 831 and 832 on the optical path varied because of discharge in the slab optical amplifier 351_1. In FIG. 12B, the dashed arrows represent the correct optical path and the solid arrows represent the varied optical path.

The controller 526 may calculate the position of the beam profile 831 observed by the beam profiler 485 in the image 811. For example, the controller 526 may calculate the centroid in the image 811 from the observed beam profile 831 and store the coordinates of the centroid in the image 811 as the position of the observed beam on the current optical path.

Furthermore, the controller 526 may calculate the position of the beam profile 832 observed by the beam profiler 486 in the image 812. For example, the controller 526 may calculate the centroid in the image 812 from the observed beam profile 832 and store the coordinates of the centroid in the image 812 as the position of the observed beam on the current optical path.

The controller 526 may calculate the displacement amount (difference) D1 between the position of the beam on the correct optical path and the position of the observed beam at the beam profiler 485. The controller 526 may further calculate the displacement amount (difference) D2 between the position of the beam on the correct optical path and the position of the observed beam at the beam profiler 486. The displacement amounts D1 and D2 may take a positive or a negative value depending on the direction.

A variation in optical path may include an angular variation component and a translational variation component.

Figure 12C:
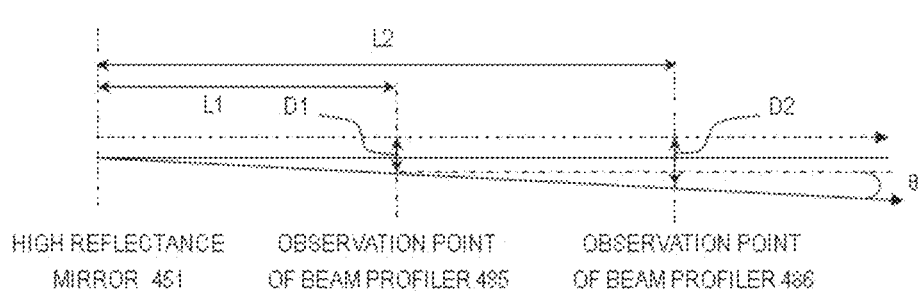
FIG. 12C equivalently illustrates the correct optical path and the varied optical path in Embodiment 4.

FIG. 12C illustrates a correct optical path and a varied optical path equivalently. In FIG. 12C, L1 represents the distance between the high reflectance mirror 451 and the observation point of the beam profiler 485 along the correct optical path. L2 represents the distance between the high reflectance mirror 451 and the observation point of the beam profiler 486 along the correct optical path. L1 and L2 may be measured in advance.

D1 represents a displacement amount between the positions of the beams observed by the beam profiler 485. D2 represents a displacement amount between the positions of the beams observed by the beam profiler 486. θ represents a compensation angle for the optical path correction mechanism 650 to correct the optical path. θ may take a positive or a negative value depending on the direction of the displacement.

In FIG. 12C, a relation expressed by the following formula (1) may be established:

$$D2-D1=(L2-L1)\tan\theta \quad \text{Formula (1)}$$

Formula (1) may derive the following formula (2):

$$\theta=\tan^{-1}((D2-D1)/(L2-L1)) \quad \text{Formula (2)}$$

The controller 526 may send the compensation angle θ for the high reflectance mirror 451 calculated with Formula (2) to the optical path correction mechanism 650. The optical path correction mechanism 650 may change the angle of the high reflectance mirror 451 by the compensation angle θ. The optical path correction mechanism 650 may hold relational information on the relation between the compensation angle θ and the amount to move the arm 464 and control the arm 464 in accordance with this relational information and the compensation angle θ.

Figure 13A:
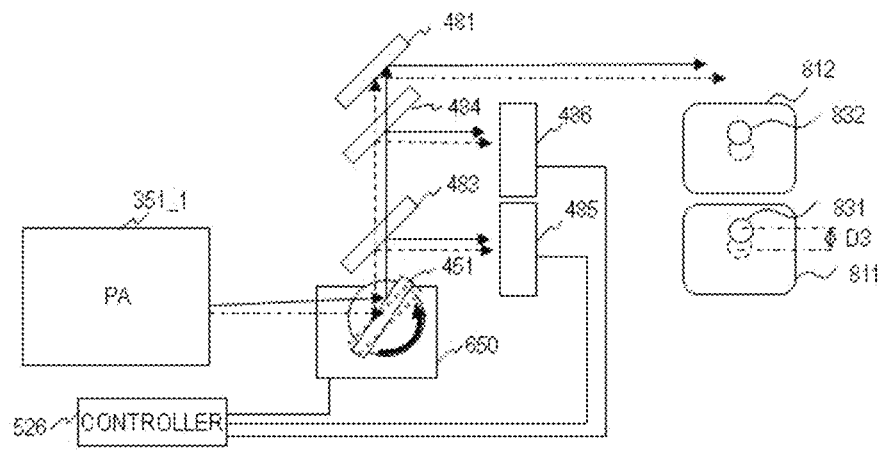
FIG. 13A schematically illustrates beam profiles after the angular component in the varied optical path is compensated in Embodiment 4.

FIG. 13A illustrates a state after the angular correction is applied by the high reflectance mirror 451. In FIG. 13A, the dashed arrows represent the correct optical path and the solid arrows represent the optical path after the angular correction. After angular correction is applied by the high reflectance mirror 451, the controller 526 may acquire a beam profile 831 observed by the beam profiler 485.

The controller 526 may calculate the position of the acquired beam profile 831 in the image 811. For example, the controller 526 may calculate the centroid in the image 811 from the observed beam profile 831 and store the coordinates of the centroid in the image 811 as the observed position of the beam on the current optical path.

Figure 13B:
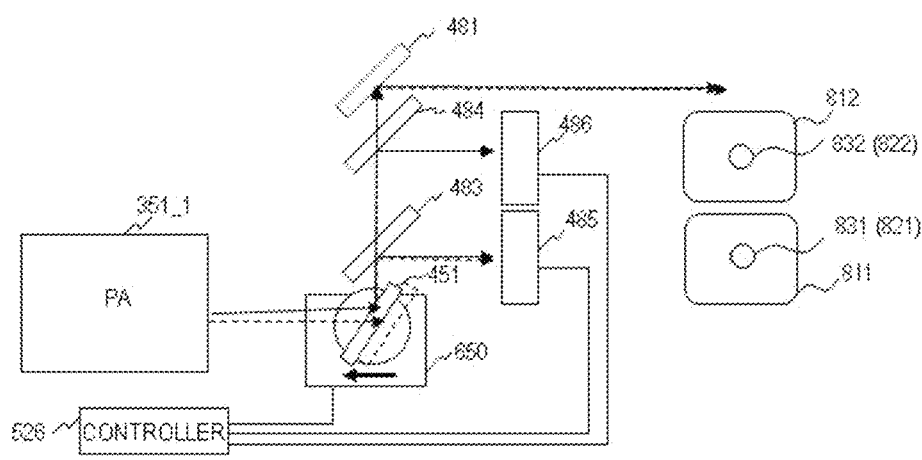
FIG. 13B schematically illustrates beam profiles after the angular component and the translational component in the varied optical path are compensated in Embodiment 4.

The controller 526 may calculate the displacement amount (difference) D3 between the position of the beam on the correct optical path and the position of the observed beam in the beam profiler 485. The controller 526 may send an instruction to the optical path correction mechanism 650 to translate the high reflectance mirror 451 to reduce the displacement amount D3 to be close to zero. FIG. 13B illustrates a state after translational correction is applied in addition to the angular correction.

9.4 Modification

Figure 14:
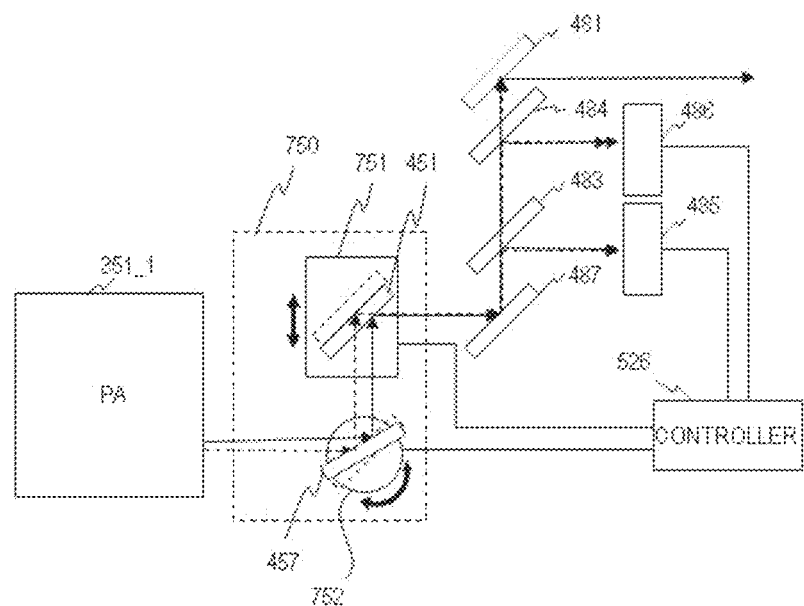
FIG. 14 schematically illustrates a configuration of a part of a laser apparatus including a modification of the optical path correction mechanism in Embodiment 4.

FIG. 14 schematically illustrates a modification of an optical path correction mechanism in the present embodiment. The laser apparatus 3 may include an optical path correction mechanism 750 in place of the optical path correction mechanism 650. The laser apparatus 3 may further include a high reflectance mirror 487 disposed on the optical path between the optical path correction mechanism 750 and the beam sampler 483.

The optical path correction mechanism 750 may include an angle adjustment actuator 752 and a translation actuator 751. A high reflectance mirror 457 may be provided on the angle adjustment actuator 752. A high reflectance mirror 451 different from the high reflectance mirror 457 may be provided on the translation actuator 751.

The angle adjustment actuator 752 may adjust only the angle of the high reflectance mirror 457 in free-space directions without translating the high reflectance mirror 457. The translation actuator 751 may only translate the high reflectance mirror 451 in a free-space direction without adjusting the angle of the high reflectance mirror 451.

The beam emitted from the slab optical amplifier 351_1 may hit the high reflectance mirror 457. The laser beam reflected by the high reflectance mirror 457 may hit the high reflectance mirror 451. The laser beam reflected by the high reflectance mirror 451 may hit the high reflectance mirror 487. The laser beam reflected by the high reflectance mirror 487 may reach the beam sampler 483.

The controller 526 may be electrically connected with the angle adjustment actuator 752 and the translation actuator 751. The controller 526 may adjust the angle of the high reflectance mirror 457 using the same method of adjusting the angle of the high reflectance mirror 451 in the optical path correction mechanism 650. The controller 526 may translate the high reflectance mirror 451 using the same method of translating the high reflectance mirror 451 in the optical path correction mechanism 650.

The present embodiment may be able to correct the optical path more precisely by compensating for both of the translational component and the angular component of the variation in optical path caused by the slab optical amplifier 351_1. The angle adjustment actuator 752 may be provided downstream of the translation actuator 751.

The laser apparatus 3 may compensate for only the translational component of the variation in optical path without compensating for the angular component. The laser apparatus 3 may include an optical path correction mechanism 450 having the same configuration as the one in the Embodiment 3. The controller 526 may calculate the translational component of the variation in optical path from the beam positions observed at two points and move the high reflectance mirror 451 so as to compensate for the translational component.

10. Embodiment 5: Laser Apparatus Including Optical Path Correction Mechanism Provided on Input Side of Slab Optical Amplifier Hereinafter, a laser apparatus in Embodiment 5 is described. In the present embodiment, differences from Embodiment 3 are mainly described. The optical path correction mechanism in the present embodiment may be provided upstream of the slab optical amplifier.

Figure 15:
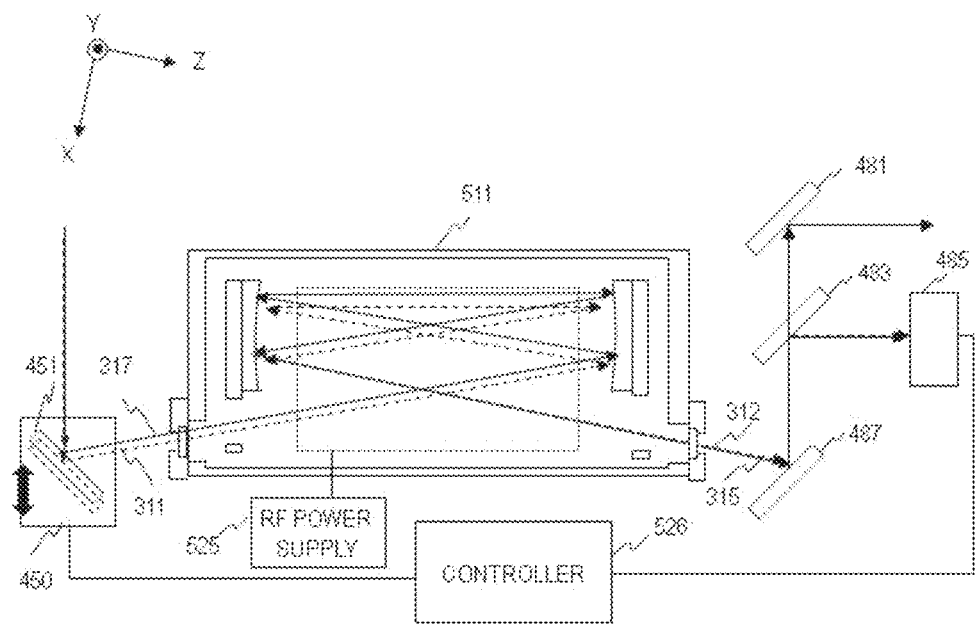
FIG. 15 schematically illustrates a configuration of a part of a laser apparatus including an optical path correction mechanism in Embodiment 5.

FIG. 15 illustrates a configuration of a part of the laser apparatus 3 in the present embodiment. The laser apparatus 3 may include an optical path correction mechanism 450 provided on the optical path of the laser beam entering the slab optical amplifier 351_1. The laser apparatus 3 may include a high reflectance mirror 487 downstream of the slab optical amplifier 351_1.

The laser beam reflected by the high reflectance mirror 451 may enter the slab optical amplifier 351_1. The laser beam emitted from the slab optical amplifier 351_1 may hit the high reflectance mirror 487. The laser beam reflected by the high reflectance mirror 487 may hit the beam sampler 483. The controller 526 may control the optical path correction mechanism 450 using the same method as the method in Embodiment 3.

In the configurations in Embodiment 1 and Embodiment 2, the optical path correction mechanism 450 may be disposed on the optical path of the laser beam entering the slab optical amplifier 351_1. In the configuration in Embodiment 4, the optical path correction mechanism 650 may be disposed on the optical path of the laser beam entering the slab optical amplifier 351_1.

11. Embodiment 6: Laser Apparatus Including Optical Path Correction Mechanism (Crystal-Slab Optical Amplifier)

11.1 Configuration of Crystal-Slab Optical Amplifier

Figure 16A:
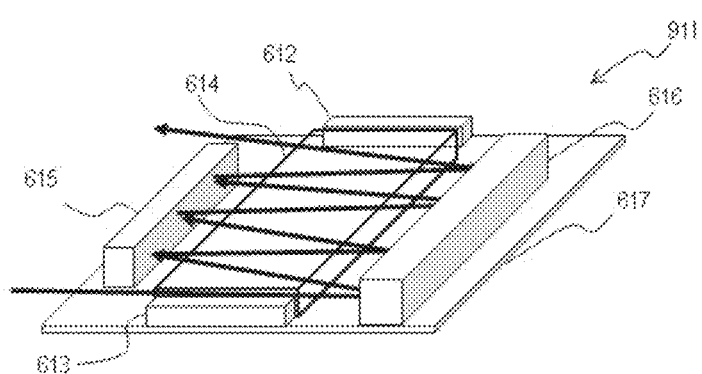
FIG. 16A schematically illustrates a configuration example of a crystal-slab optical amplifier.
Figure 16B:
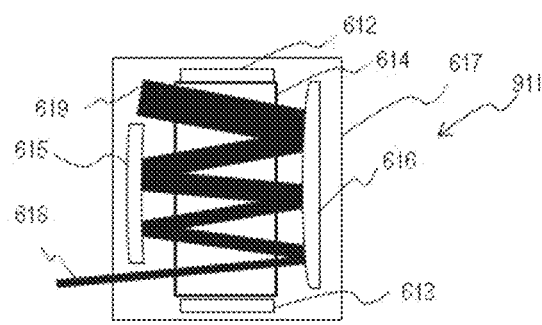
FIG. 16B schematically illustrates a configuration example of a crystal-slab optical amplifier.

FIGS. 16A and 16B illustrate a configuration example of a crystal-slab optical amplifier. The crystal-slab optical amplifier is a kind of a slab optical amplifier. FIG. 16A is a perspective view and FIG. 16B is a top plan view. The crystal-slab optical amplifier 911 may include a crystal slab 614, a cylindrical concave mirror 615, a cylindrical convex mirror 616, and diode laser stacks 612 and 613; these components may be mounted on a base plate 617.

The crystal slab 614 may be an amplification region shaped like a slab. The crystal slab 614 may be a crystal laser medium shaped like a slab; the surface to receive and emit the laser beam may be polished. The polished surface may be provided with an antireflection coating for the wavelength of the laser beam. The crystal slab 614 may be a Nd:YVO$_4$ crystal, for example.

The diode laser stacks 612 and 613 may be composed of a plurality of laser diodes. For example, the diode laser stacks 612 and 613 may be provided on the end faces other than the end face to receive the laser beam to be amplified and the end face to emit the amplified laser beam among the end faces of the crystal slab 614. The diode laser stacks 612 and 613 may be connected with a not-shown power supply. The diode laser stacks 612 and 613 may oscillate at a wavelength of, for example, 808 nm.

The cylindrical concave mirror 615 and the cylindrical convex mirror 616 may be disposed to face each other across the crystal slab 614. The cylindrical concave mirror 615 and the cylindrical convex mirror 616 may be disposed so that the laser beam entering the crystal slab 614 will multipass to travel in zig-zags inside the crystal slab 614 and exit from the crystal slab 614.

A free-space direction may be a given direction in the plane where the laser beam travels in the crystal slab 614. The plane where the laser beam travels may be parallel to the wide faces of the crystal slab 614. The wide faces may be the faces having the largest area in the crystal slab 614. Any free-space direction may be perpendicular to the face of the crystal slab 614 to receive and emit the laser beam. A waveguide direction may be a direction perpendicular to the plane where the laser beam travels in the crystal slab 614. The waveguide direction may be parallel to the face of the crystal slab 614 to receive and emit the laser beam.

11.2 Operation of Crystal-Slab Optical Amplifier

Upon receipt of electric power from a not-shown power supply, the diode laser stacks 612 and 613 may be excited to emit excitation laser beams into the crystal slab 614. As a result, the crystal slab 614 may be excited. The start time of emitting the excitation laser beams may be the activation time.

A laser beam 618 that enters the excited crystal slab 614 from the external may be amplified in the crystal slab 614. The amplified laser beam 619 may be outputted from the crystal slab 614. The laser beam may travel in zig-zags between the cylindrical concave mirror 615 and the cylindrical convex mirror 616 to be multipass-amplified. The laser beam may be amplified between the cylindrical concave mirror 615 and the cylindrical convex mirror 616 while the cross-section area of the beam increases in a free-space direction.

11.3 Issues on Crystal-Slab Optical Amplifier

The excitation lasers from the diode laser stacks 612 and 613 and the laser beam to be amplified incident on the crystal slab 614 heat the crystal slab 614 to expand the base plate 617 holding the crystal slab. The distance between the cylindrical concave mirror 615 and the cylindrical convex mirror 616 secured to the base plate 617 may increase with the expansion of the base plate 617.

As a result, the optical path of the amplified beam emitted from the crystal slab optical amplifier 911 may be translated. The optical path may also move because of the thermal expansion or the variation in refractive index of the crystal slab 614 caused by variation in temperature.

11.4 Laser Apparatus Including Optical Path Correction Mechanism

Figure 17:
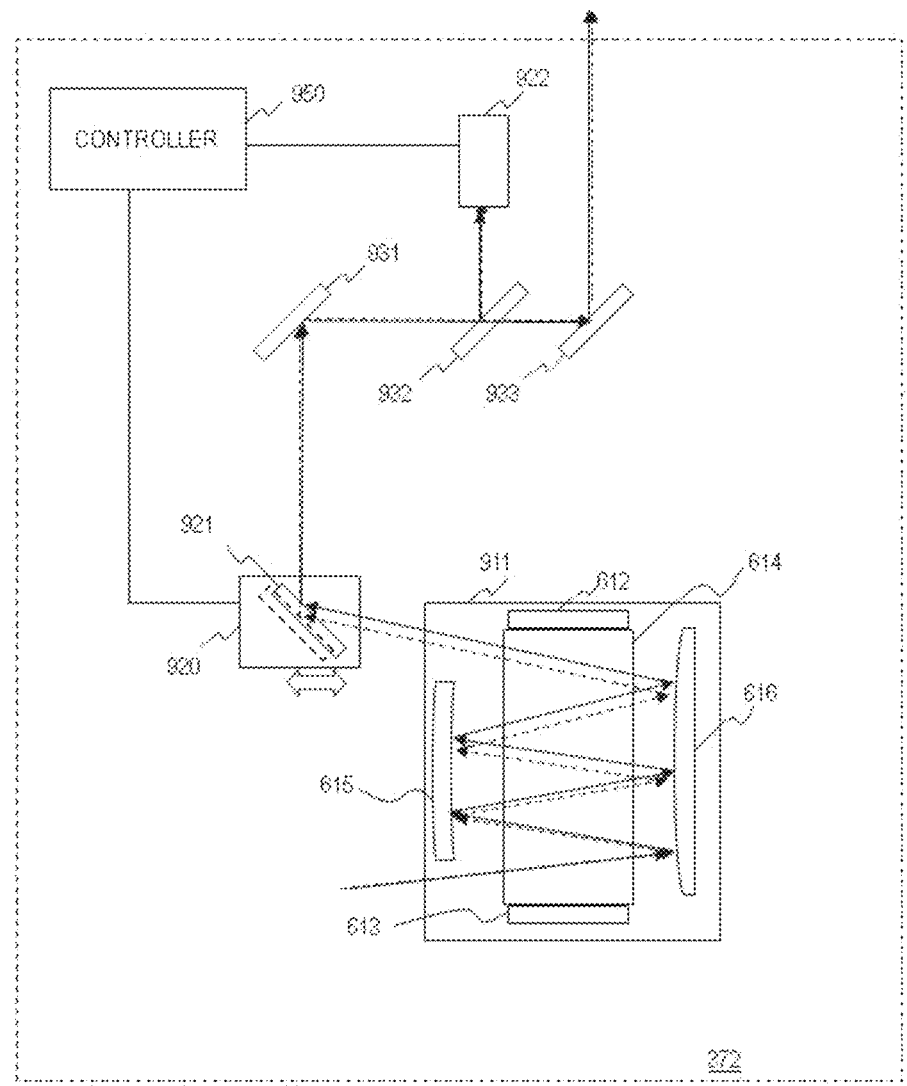
FIG. 17 schematically illustrates a configuration of a part of a laser apparatus including an optical path correction mechanism in Embodiment 6.

FIG. 17 schematically illustrates a configuration example of a part of a laser apparatus 372 including a correction mechanism for correcting the optical path varied in a crystal-slab optical amplifier. The laser apparatus 372 may include a crystal-slab optical amplifier 911, an optical path correction mechanism 920, high reflectance mirrors 931 and 933, a beam sampler 932, a beam profiler 922, and a controller 950. The dashed arrows represent the original optical path and the solid arrows represent a varied optical path.

The optical path correction mechanism 920 may be provided on the output side of the crystal-slab optical amplifier 911. The optical path correction mechanism 920 may include a high reflectance mirror 921. The optical path correction mechanism 920 may have the same configuration as that of the optical path correction mechanism 450 illustrated in FIGS. 6A and 6B.

The high reflectance mirror 931 may reflect the laser beam reflected by the high reflectance mirror 921. The beam sampler 932 may be disposed downstream of the high reflectance mirror 921 to reflect a part of the reflection from the high reflectance mirror 921 as a sample beam and transmit the other components. The high reflectance mirror 933 may be disposed downstream of the beam sampler 932 to reflect the laser beam transmitted through the beam sampler 932.

The beam profiler 922 may be disposed at a place to receive the sample beam from the beam sampler 932. Any type of beam profiler may be used for the beam profiler 922. The controller 950 may be electrically connected with the optical path correction mechanism 920 and the beam profiler 922. The controller 950 may control the optical path correction mechanism 920 based on the beam profile acquired from the beam profiler 922 using the same method described in Embodiment 3.

The present embodiment may appropriately correct the optical path varied in the crystal-slab optical amplifier 911. It should be noted that the other configurations described in Embodiments 1 to 5 to correct the optical path may be applicable to correct the optical path varied in the crystal-slab optical amplifier 911.

12. Embodiment 7: Laser Apparatus Including Main Pulse Laser Device and Pre-pulse Laser Device

12.1 Configuration of Laser Apparatus

Figure 18:
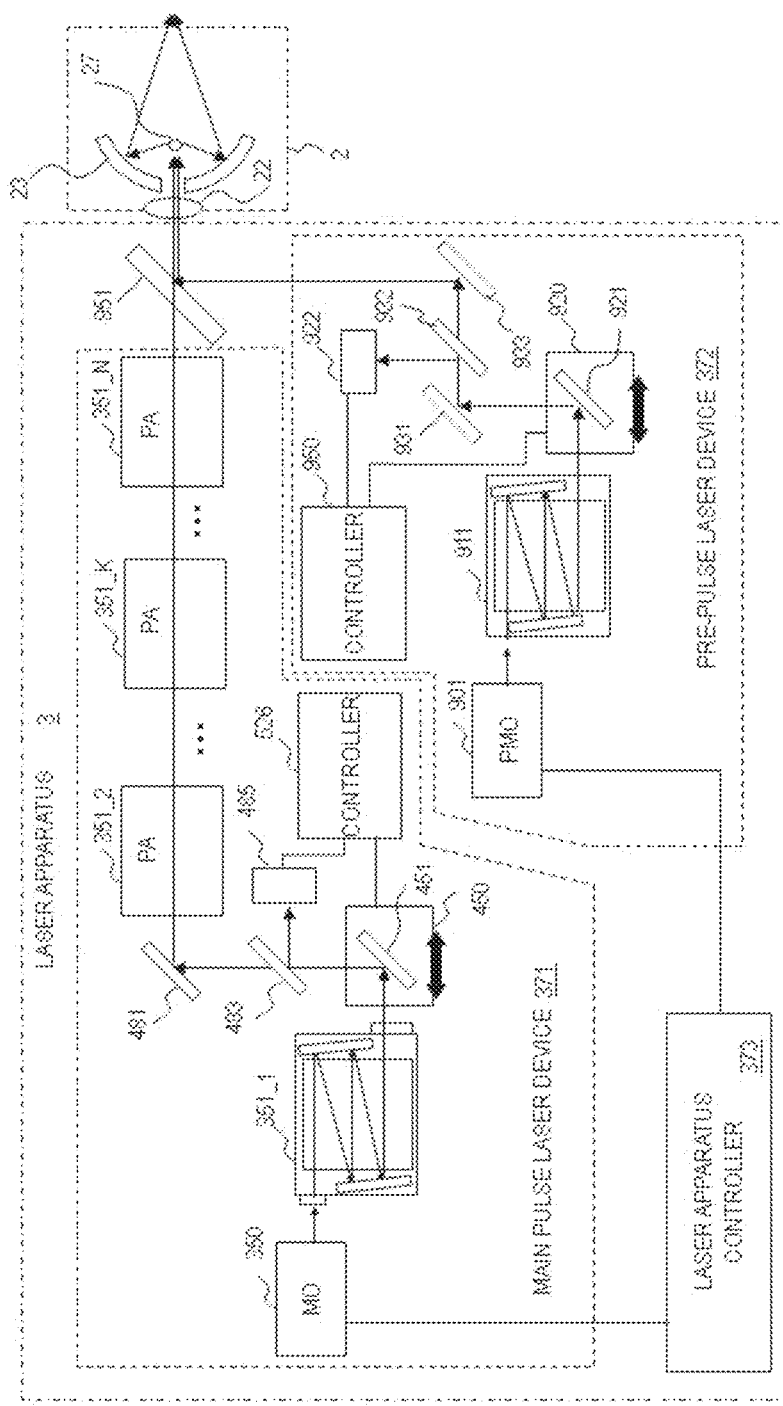
FIG. 18 schematically illustrates a configuration of a laser apparatus including a main pulse laser device and a pre-pulse laser device in Embodiment 7.

FIG. 18 schematically illustrates a configuration of a laser apparatus 3 in the present embodiment. The laser apparatus 3 may include a main pulse laser device 371, a pre-pulse laser device 372, a beam combiner 951, and a laser apparatus controller 373. Each of the main pulse laser device 371 and the pre-pulse laser device 372 may include an optical path correction mechanism to correct the optical path varied in a slab optical amplifier.

The main pulse laser device 371 may have a configuration illustrated in FIGS. 2 and 9. The pre-pulse laser device 372 may have a configuration illustrated in FIG. 17 and in addition, include a pre-pulse master oscillator (PMO) 901. The pre-pulse master oscillator 901 may be the master oscillator in the pre-pulse laser device 372. The pre-pulse master oscillator 901 may be a laser oscillator including a Nd:YVO$_4$ crystal, for example, or a diode-pumped type of mode locked laser.

The beam combiner 951 may be disposed at an intersection of the optical path of the main pulse laser beam outputted from the main pulse laser device 371 and the optical path of the pre-pulse laser beam outputted from the pre-pulse laser device 372. The beam combiner 951 may have a board to transmit the main pulse laser beam at high transmittance. The board may be formed of diamond, for example.

The surface of the beam combiner 951 to be hit by the main pulse laser beam may be provided with a thin film to prevent reflection of the main pulse laser beam. The surface of the beam combiner 951 to be hit by the pre-pulse laser beam may be provided with a reflective film to reflect the pre-pulse laser beam with high reflectance.

The laser apparatus controller 373 may be connected with the master oscillator 350 and the pre-pulse master oscillator 901 and configured to control the oscillation timing of the master oscillator 350 and the pre-pulse master oscillator 901.

12.2 Operation of Laser Apparatus

The laser apparatus controller 373 may make the pre-pulse master oscillator 901 start laser oscillation. The pre-pulse laser beam outputted from the pre-pulse master oscillator 901 may be amplified by the crystal-slab optical amplifier 911. The optical path correction mechanism 920 may correct the optical path varied in the crystal-slab optical amplifier 911. The operation of the optical path correction mechanism 920 may be the same as the operation described with reference to FIG. 17.

The laser apparatus controller 373 may make the master oscillator 350 start laser oscillation. The operation of the main pulse laser device 371 may be the same as the operation described with reference to FIGS. 2 and 9.

The pre-pulse laser beam may be reflected by the beam combiner 951 to be directed to the laser beam focusing mirror 22 and collected by the laser beam focusing mirror 22 to hit a target 27 in the chamber 2. The target 27 hit by the pre-pulse laser beam may be dispersed and diffused as mist.

The laser apparatus controller 373 may control the time for the master oscillator 350 to output the main pulse laser beam so that the diffused target 27 will be irradiated with the main pulse laser beam when a predetermined time has passed since the pre-pulse laser beam hits the target 27.

The main pulse laser beam outputted from the main pulse laser device 371 may transmit through the beam combiner 951, be collected by the laser beam focusing mirror 22, and be applied to the diffused target 27. The diffused target 27 may turn into plasma because of the application of the main pulse laser beam. The plasma may radiate EUV light. The EUV light may be collected by the EUV collector mirror 23 and outputted to the exposure apparatus 6 (see FIG. 1) connected with the chamber 2.

The present embodiment may be able to appropriately correct the optical path varied in the slab optical amplifier in each of the main pulse laser device 371 and the pre-pulse laser device 372. Only either one of the main pulse laser device 371 and the pre-pulse laser device 372 may include the optical path correction mechanism. Alternatively, the main pulse laser device 371 and the pre-pulse laser device 372 may include a plurality of optical path correction mechanisms.

One or more of Embodiments 1 to 6 in the present specification may be applied to the main pulse laser device 371 and the pre-pulse laser device 372. The main pulse laser device 371 and the pre-pulse laser device 372 may employ the same optical path correction technique or different optical path correction techniques. The laser apparatus described in the present specification may be applied to a system different from an extreme ultraviolet light generation system. The optical path correction mechanism may translate the high reflectance mirror or change the angle of the high reflectance mirror by manual operation, without using the controller.

As set forth above, the present invention has been described with reference to embodiments. The foregoing description is merely provided for the purpose of exemplification but not limitation. Accordingly, it is obvious for a person skilled in the art that the embodiments in this disclosure may be modified within the scope of the appended claims.

A part of the configuration of an embodiment may be replaced with a configuration of another embodiment. A configuration of an embodiment may be incorporated to a configuration of another embodiment. A part of the configuration of each embodiment may be removed, added to a different configuration, or replaced by a different configuration.

The terms used in this specification and the appended claims should be interpreted as "non-limiting". For example, the terms "include" and "be included" should be interpreted as "including the stated elements but not limited to the stated elements". The term "have" should be interpreted as "having the stated elements but not limited to the stated elements". Further, the modifier "one (a/an)" should be interpreted as "at least one" or "one or more."

What is claimed is:

1. A laser apparatus comprising:
   an oscillator capable of outputting a laser beam;
   a slab optical amplifier capable of amplifying the laser beam outputted by the oscillator by passing the laser beam through an optical amplification region shaped like a slab and outputting the amplified laser beam; and a mirror disposed on an optical path of the laser beam to enter the slab optical amplifier or the amplified laser beam outputted from the slab optical amplifier, the mirror being movable in a direction parallel to a plane where the laser beam travels in the slab optical amplifier.

2. The laser apparatus according to claim 1, further comprising:
an optical path correction mechanism including the mirror, the optical path correction mechanism being capable of moving the mirror; and
a controller capable of controlling the optical path correction mechanism,
wherein the controller is configured to control the optical path correction mechanism to translate the mirror in a direction parallel to the plane where the laser beam travels to compensate for a translational component of a variation in optical path in the slab optical amplifier.

3. The laser apparatus according to claim 2, further comprising:
a beam sampler disposed downstream of the slab optical amplifier and the mirror; and
a beam profiler capable of receiving a sample laser beam from the beam sampler,
wherein the controller is configured to:
acquire beam profile data from the beam profiler;
calculate a beam position from the acquired beam profile data; and
determine an amount to move the mirror based on a difference between the beam position and a reference beam position.

4. The laser apparatus according to claim 2, further comprising:
a first beam sampler disposed downstream of the slab optical amplifier and the mirror;
a first beam profiler capable of receiving a sample laser beam from the first beam sampler;
a second beam sampler disposed downstream of the first beam sampler;
a second beam profiler capable of receiving a sample laser beam from the second beam sampler,
wherein the controller is configured to:
calculate a difference between a position of a beam observed by the first beam profiler and a first reference beam position;
calculate a difference between a position of a beam observed by the second beam profiler and a second reference beam position; and
determine an angular amount to tilt and an amount to translate the mirror based on the difference in the first beam profiler and the difference in the second beam profiler.

5. The laser apparatus according to claim 2, further comprising:
a first beam sampler disposed downstream of the slab optical amplifier and the mirror;
a first beam profiler capable of receiving a sample laser beam from the first beam sampler;
a second beam sampler disposed downstream of the first beam sampler;
a second beam profiler capable of receiving a sample laser beam from the second beam sampler,
wherein the optical path correction mechanism further includes a second mirror upstream or downstream of the mirror, the second mirror being capable of being tilted with respect to a direction parallel to the plane where the laser beam travels, and
wherein the controller is configured to:
calculate a difference between a position of a beam observed by the first beam profiler and a first reference beam position;
calculate a difference between a position of a beam observed by the second beam profiler and a second reference beam position; and
determine an amount to translate the mirror and an angular amount to tilt the second mirror based on the difference in the first beam profiler and the difference in the second beam profiler.

6. The laser apparatus according to claim 2, wherein the controller is configured to determine an amount to translate the mirror based on a temperature of the slab optical amplifier.

7. The laser apparatus according to claim 2, wherein the controller is configured to determine an amount to translate the mirror based on a time elapsed since activation of the slab optical amplifier.

8. An extreme ultraviolet light generation system comprising:
a chamber;
a target supply device capable of supplying a target into the chamber;
the laser apparatus according to claim 1 capable of outputting a pulse laser beam to hit the target in the chamber; and
a collector mirror capable of collecting extreme ultraviolet light radiated from the target hit by the pulse laser beam and turned into plasma.

9. The extreme ultraviolet light generation system according to claim 8,
wherein the laser apparatus includes a pre-pulse laser device and a main pulse laser device, and
wherein the main pulse laser device includes the slab optical amplifier and the mirror.

* * * * *